Feb. 15, 1944.  J. A. BAKER  2,341,893
AIR DRYING DEVICE
Filed Feb. 13, 1942
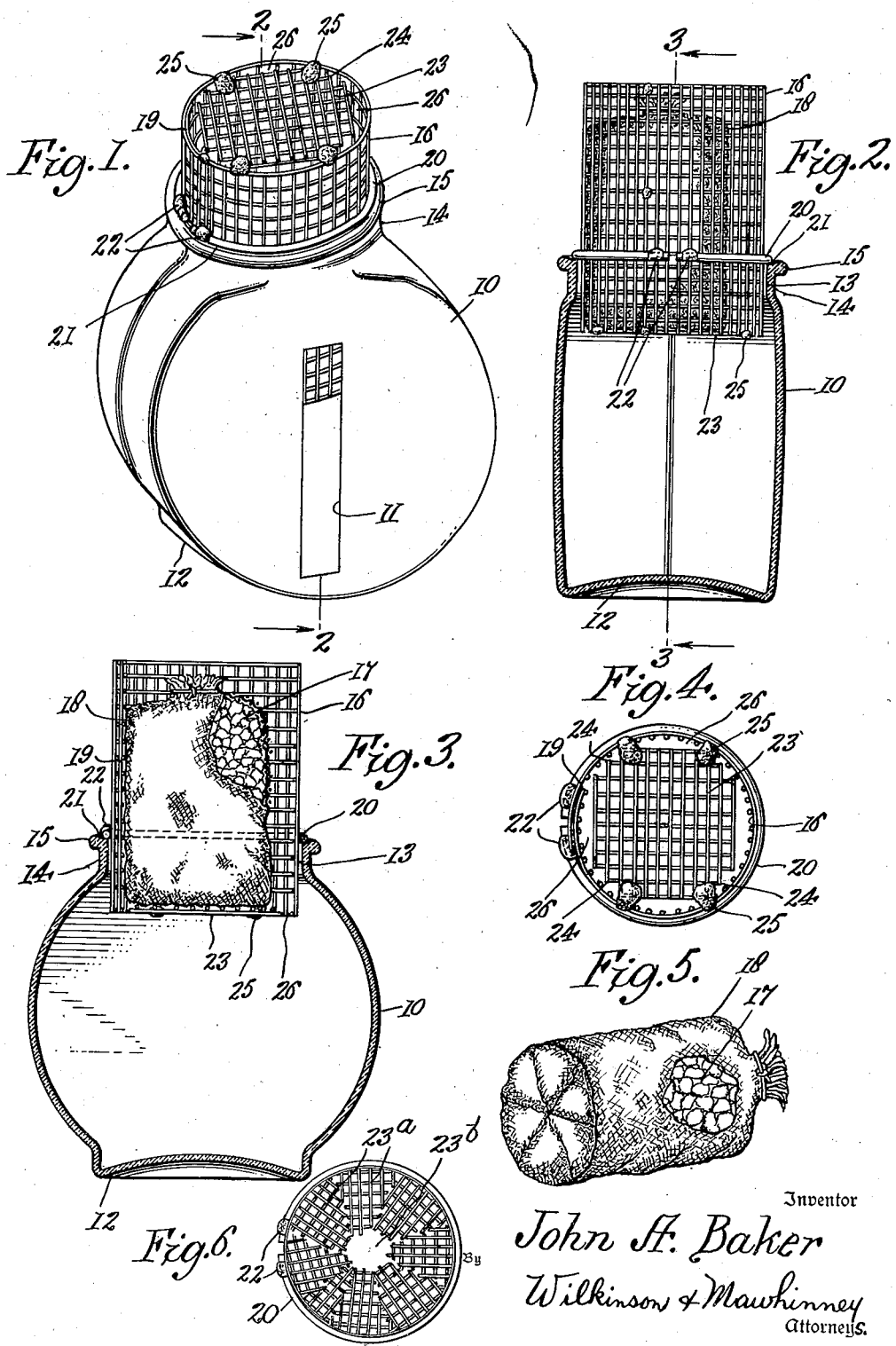
Inventor
John A. Baker
Wilkinson & Mawhinney
Attorneys Patented Feb. 15, 1944

2,341,893

UNITED STATES PATENT OFFICE 2,341,893

AIR DRYING DEVICE

John A. Baker, Miami, Fla.

Application February 13, 1942, Serial No. 430,826

1 Claim. (Cl. 183—4.4)

The present invention relates to improvements in air drying devices, and has for an object to provide a unit for holding a chemical substance having the properties of absorbing moisture from a surrounding atmosphere in combination with a container so related to the chemical holder as to receive the water of condensation.

Another object of the invention is to provide a unit or device which will reduce or eliminate damp conditions in indoor atmospheres for the purpose of protecting the interior of the home, household effects, clothing, etc.

It is a further object of the invention to dispense with moisture-laden air in the home and the accompanying damage wrought by condensation, mold, mildew, warping of floors, rotting and musty odors.

The invention has for a still further object to provide a device which is clean, harmless and having a capacity to pull moisture from the air up to three times its own weight.

The invention is useful in hotel rooms, apartments, clothes closets and homes, particularly those being closed for a period of time.

The improved unit or device is useful in connection with refills of chemical material to the end that the unit or device may be of a permanent character.

With the foregoing and other objects in view, the invention will be more fully described hereinafter, and will be more particularly pointed out in the claim appended hereto.

In the drawing, wherein like symbols refer to like or corresponding parts throughout the several views, Figure 1 is a perspective view of an air drying device constructed in accordance with the present invention with the chemical holder in the inverted position for shipment.

Figure 2 is a vertical central section taken on the line 2—2 in Figure 1 with the chemical holder upright and with a sack of the chemical reposing therein in a condition of use.

Figure 3 is a longitudinal central vertical section taken on the line 3—3 in Figure 2.

Figure 4 is a bottom plan view of the chemical holder removed from the container, and Figure 5 is a perspective view of a unit form of the chemical material.

Figure 6 is a bottom plan view of the modified form of holder.

Referring more particularly to the drawing 10 represents generally a container or receptacle for the liquid or water which is absorbed from the atmosphere by the chemical material, usually calcium chloride. This container may be of glass, metal, plastic or any desired material. In the instance shown it is of glass having an external coating of a paint or varnish to render the same opaque with one wall thereof having a vertical gauge strip left transparent for observation purposes through which the level of the liquid in the container 10 may be learned at all times. The container may have a suitable base 12 enabling it to be seated upon the floor, a table or other support. The external configuration may conform to any desired design, for instance following the lines of a vase or other ornamental interior decoration.

The container has an open mouth 13 defined by a neck 14 surmounted by a bead 15 which is both decorative and strengthening to the upper edge of the neck 14 which is preferably round in a substantially horizontal direction. The neck 15 provides a greater mass of material in a generally horizontal direction at the upper circular edge of the neck 14 to strengthen the container at that part which receives the weight of the chemical unit and its holder 16. The holder may be of any appropriate cross section, preferably circular and of an open-work, foraminous, reticulated, mesh or other like construction affording ample opportunity for the complete and substantially uninterrupted passage of air through the holder 16 and into intimate contact with the crystals or other particles 17 of the chemical material which will be conveniently apportioned as to mass in open-work or mesh flexible sacks 18 in which the interstices are of smaller gauge than the particle size of the crystals 17 to prevent the escape of the chemical crystals from the bag or sack 18 in which they are confined in measured quantities. These sacks 18 may be sold in cartons containing one or more of the sacks and are constructed and packaged for economical purchase and use.

The holder 16 may be made of wire mesh in which a flat piece of wire may be rolled into substantially cylindrical form with its edges overlapped as indicated at 19 in Figure 4, the overlapping portions being soldered or otherwise secured together. The diameter of the cylinder or tube will be slightly less than that of the interior of the container neck 14 through which the holder 16 may be readily passed. Extending about the chemical holder 16 is a rod 20 which is soldered or otherwise secured to the reticulated wall 16 and is preferably of a round cross section to conform to the concave seat 21 formed on the upper edge of the neck 14 and upon the inner portion of the lip or bead 15, the concavity 21 being so formed that it is on the rising curve at the outer part of the bead 15 which will tend to prevent the annular rod support 20 from riding up on this outer part of the seat 21. On the contrary the inner portion of the concavity 21 will slope downwardly, thus causing the rod 20 with its rounded external wall to tend to ride down centrally upon seat 21 for the purpose of centering the chemical holder 16 in the liquid container 10. At 22 are shown solder joints for connecting the slightly spaced ends (see Figure 2) of the joint support 20 to the wall of the holder 16. Other solder joints may be made at various other portions of the rod 20 round the circumference of the wall 16. The tube which is the holder 16 is closed at one end by a bottom wall 23. This wall is also preferably of a wire mesh material although it may be any other form of open-work, foraminous or reticulated material.

As best seen in Figure 4 the end wall 23 is cut out square or rectangular from a piece of wire mesh of a size larger than the diameter of the cylinder on which the holder 16 is made and the corner portions are then cut off diagonally as indicated at 24 at such points as will permit the bottom 23 to be snugly received into the cylinder 16. Obviously if a square bottom 23 was cut out from a piece of mesh stock of a size to fit into the cylinder 16 the pointed corner portions would afford only four very restricted points to receive the solder 25 for attaching the bottom 23 to the holder 16 and the spaces 26 between the four edges of the bottom 23 and the circular side wall 16 would necessarily be very large. These spaces are defined by chords which subtend arcs on the circumference of the circle 16. By designing and cutting the bottom 23 of a seize normally larger than the circle 16 and subsequently cutting off the corners along the diagonals 24, these chords are very much reduced in length and allowed to approach more closely to the circumference 16 so as to reduce the spaces 26 to a value which will avoid weakening the bottom construction and affording ample support for the sack of chemical material 18, besides the diagonals affording substantial linear contact or close approach to contact with the wall 16 as against the single point contact of the uncut corner portions of an initially smaller rectangle 23. This enables the solder joints 25 to unite a larger area of the base 23 with the side wall 16.

A comparison of Figures 1 and 2 will show that the rod support 20 is closer to the bottom 23 than the open end of the tubular holder 16. This is for the purpose of substantially nesting the holder 16 in the container 10 when in the inverted position shown in Figure 1 which is the position assumed during transportation and periods of non-use. Figure 2 shows the upright position of the holder 16 in which the open end is uppermost for receiving therein the sack 18 of the chemical material, which sack rests freely upon the bottom 23. In the position of Figure 2 the holder 16 projects up above the container 10 to a greater degree than in the inverted position of Figure 1 to the end of exposing greater surface area of the chemical to the circumambient indoor atmosphere.

The rod 20 is coaxial with the cylinder 16 but it is offset from the center of the tube 16 when referred to the vertical height of the tube, such offsetting or displacement being toward the bottom 23 and remote from the open mouth of the tube 16. This leaves the greater vertical wall length of holder 16 above the rod support 20 when the holder 16 is in the upright position shown in Figures 2 and 3. When inverted the lesser vertical length of holder 16 extends above the container 10, as seen in Figure 1. The method of support by the free open seat 21 and the rod support 20 allows of the lifting and replacement of the holder 16 and its being shifted from upright to inverted position with ease and convenience.

In use the holder 16, being in the position shown in Figure 1, is lifted vertically completely out of the container 10; it is then turned to an upright position and dropped back in the container 10 until the rod 20 rests upon the seat 21. A sack of chemical material is then dropped down into the holder 16. The holder will maintain the sack in substantially the position shown in Figures 2 and 3. Such chemical material will rapidly absorb and extract the moisture from the atmosphere. As the material 17 becomes surcharged with moisture and certainly when saturated, it will give off the moisture in the form of liquid which will drip down by gravity through the mesh bottom 23 of the holder 16 into the container 10. Here it will accumulate. The rising level of the liquid in the container 10 will show through the gauge 11. From time to time the holder 16 may be lifted off the container and collected liquid decanted from such container 10. The form of holder and its supporting arrangement enables such operations to be performed with ease and celerity.

Referring more particularly to Figure 6, in this form the bottom is composed of segments 23ᵃ forming prolongations of the side wall of the holder which are folded under at right angles to such side wall and preferably in overlapping relation. The overlapped parts may be soldered or otherwise joined together or joints may be omitted as the inherent stiffness of the material will maintain the same to shape. The opening 23ᵇ may be left in the central portion of the bottom in view of the fact that the chemical material is packaged. The opening 23ᵇ will form a larger surface for dripping purposes than if the bottom were carried completely across the opening. These bottom segments are folded over by what may be termed a crimping process. This form of the invention eliminates considerable cutting and soldering.

Many adaptations of the device may be made. For instance the device is adaptable to bread and cake boxes or to food boxes generally in which a compartment or socket may be provided to contain the air drying device. For food boxes the unit or air drying device may be smaller than that used in the open atmosphere of the room and it may be rectangular or of other shape. Another instance of the adaptation of the device is for use inside pianos where the device will be insulated with rubber, felt or some other appropriate material to prevent changing the acoustics of the piano.

Other adaptations of the invention may be applied to furniture and household effects generally.

It is obvious that various changes and modifications may be made in the details of construction and design of the above specifically described embodiment of this invention without departing from the spirit thereof, such changes and modifications being restricted only by the scope of the following claim.

What is claimed is:

An air drying device comprising a container having an open mouth at its upper end with a concave seat about the mouth, a chemical holder having a mesh bottom and mesh side wall with open top, a rod of round cross-section secured to the mesh side wall spaced above the mesh bottom and below the center of the holder and adapted to freely occupy said concave seat, and bagged crystals of water-absorptive material loosely placed through the mouth of the holder and supported on the mesh bottom.

JOHN A. BAKER.